(12) United States Patent
Agarwal et al.

(10) Patent No.: US 11,995,195 B2
(45) Date of Patent: May 28, 2024

(54) SYSTEM AND DEVICE FOR DATA MANAGEMENT

(71) Applicants: Rohan Hari Agarwal, New Delhi (IN); Vipul Saini, Delhi (IN)

(72) Inventors: Rohan Hari Agarwal, New Delhi (IN); Vipul Saini, Delhi (IN)

( * ) Notice: Subject to any disclaimer, the term of this patent is extended or adjusted under 35 U.S.C. 154(b) by 488 days.

(21) Appl. No.: 17/285,147

(22) PCT Filed: Oct. 14, 2019

(86) PCT No.: PCT/IB2019/058728
§ 371 (c)(1),
(2) Date: May 11, 2021

(87) PCT Pub. No.: WO2020/079558
PCT Pub. Date: Apr. 23, 2020

(65) Prior Publication Data
US 2021/0357514 A1  Nov. 18, 2021

(30) Foreign Application Priority Data
Oct. 14, 2018 (IN) .............................. 201811034654

(51) Int. Cl.
*G06F 21/60* (2013.01)
*G06F 21/62* (2013.01)
*H04L 9/08* (2006.01)
*H04L 9/32* (2006.01)

(52) U.S. Cl.
CPC ............ *G06F 21/602* (2013.01); *G06F 21/62* (2013.01); *H04L 9/085* (2013.01); *H04L 9/3236* (2013.01)

(58) Field of Classification Search
CPC ....... G06F 21/602; G06F 21/62; H04L 9/085; H04L 9/3236
See application file for complete search history.

(56) References Cited

U.S. PATENT DOCUMENTS

| | | | |
|---|---|---|---|
| 8,380,994 B2 * | 2/2013 | Rajan | H04L 63/168 713/178 |
| 8,769,270 B2 * | 7/2014 | Orsini | H04L 63/10 713/165 |
| 8,837,503 B2 * | 9/2014 | Finney | H04L 49/9042 370/413 |
| 9,785,785 B2 * | 10/2017 | O'Hare | G06F 21/6209 |
| 9,973,335 B2 * | 5/2018 | Friedman | G06F 21/72 |
| 10,833,923 B2 * | 11/2020 | Trivedi | H04L 41/0896 |

* cited by examiner

*Primary Examiner* — Hosuk Song

(57) ABSTRACT

The present disclosure provides a system, device and method for data management. The system includes a processor configured to: receive, from an entity, data packets; receive, from the entity; generate a plurality of shares pertaining to the data packets by applying a threshold scheme to the data packets; and distribute the plurality of shares amongst at least two secure cryptoprocessors, wherein each secure cryptoprocessor allows access to the plurality of shares stored within it upon receipt of a corresponding second password, and wherein the processor is configured to re-generate the data packets from a threshold number of shares out of the plurality of generated shares, the value of the threshold number being predetermined.

20 Claims, 9 Drawing Sheets

SYSTEM AND DEVICE FOR DATA MANAGEMENT

TECHNICAL FIELD

The present disclosure relates generally to the field of data management. In particular, the present disclosure relates to provision of security of data against external threats.

BACKGROUND

Background description includes information that may be useful in understanding the present invention. It is not an admission that any of the information provided herein is prior art or relevant to the presently claimed invention, or that any publication specifically or implicitly referenced is prior art.

Security of private and sensitive data is paramount when internet and cloud enabled storage is being constantly probed for weaknesses that can allow malicious and unscrupulous access to private and sensitive data. Conventionally, data protection options used are,
  online storage on a server or on an internet connected device. However, this approach is highly susceptible to malware attack. Even if the data is encrypted, the attack vector can shift to the encryption key itself;
  offline storage at a single location. Though this approach can protect data from malware attacks, instances such as theft of the offline storage device or other environmental factors like physical shocks, fire, moisture etc. can also corrupt the data stored;
  replication of data and storage of the replicas in different locations. This approach overcomes the problem of loss of data due to physical reasons such as theft and environmental factors. However, it cannot protect data theft as it only requires access to any one location of storage of data; and
  splitting the data into discrete parts and storing the parts in different locations. This approach reduces the chance of data theft even if one of the locations is compromised. However, risk of loss of data is still there as the data becomes inaccessible even with loss of any one storage storing any discrete part of the whole data.

There is, therefore, a requirement in the art for an approach for managing the security of data that overcomes the problems of data storage as detailed in the above sections.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present inventions is to provide a system, method and device for data management of data packets for security of data packets.

Another object of the present disclosure is to provide a system capable of protecting data packets against data loss or data leak.

Another object of the present invention is to provide a system capable of protecting data packets from brute force attacks.

Another object of the present inventions is to provide a system capable of protecting data packets from malware attacks.

SUMMARY

The present disclosure relates generally to the field of data management. In particular, the present disclosure relates to provision of security of data against external threats.

In an aspect, the present disclosure provides a system for data management, where the system includes: a processor coupled with a memory, said memory storing instructions executable by the processor to: receive, from an entity, data packets; generate a plurality of shares pertaining to the data packets by applying a threshold scheme to the data packets; and distribute the plurality of shares amongst at least two secure crypto processors, wherein each secure cryptoprocessor allows access to the plurality of shares stored within it upon receipt of a corresponding second password, and wherein the processor is configured to re-generate the data packets from a threshold number of shares out of the plurality of generated shares, wherein the value of the threshold number is predetermined.

In an embodiment, each secure cryptoprocessor stores a number of shares that is equal to the threshold number of shares.

In another embodiment, each secure cryptoprocessor stores a number of shares that is lesser than the threshold number of shares.

In another embodiment, the processor is configured to receive a user-input password pertaining to access to shares stored in any secure crypto processor, and wherein access to the shares stored in the any secure crypto processor is granted based on positive determination of similarity between $q^{th}$ hash of the user-input password and the $q^{th}$ hash of the second password.

In another embodiment, on negative determination of similarity between $q^{th}$ hash of the user-input password and the $q^{th}$ hash of the second password, counter measures are applied to protect the plurality of shares. In another embodiment, each secure cryptoprocessor uses a unique value of q.

In another embodiment, the processor is configured to receive, from the entity, a first password.

In an embodiment, a $p^{th}$ hash of the first password is used to encrypt the data packets, where p is lesser than q. In another embodiment, each of the plurality of generated shares are concatenated with any or a combination of a $q^{th}$ hash of the second password, checksum and other additional information pertaining to encryption of the data packets. In another embodiment, the processor is configured to decrypt the encrypted data packets obtained after reconstruction of the threshold number of shares into the data packets by applying the $p^{th}$ hash of the first password.

In another embodiment, a $p^{th}$ hash of the first password is used to encrypt each of the plurality of generated shares, where p is lesser than q. In another embodiment, each set of generated shares to be distributed to a secure cryptoprocessor is encrypted using $p^{th}$ hash of a first password of the corresponding secure cryptoprocessor. In another embodiment, the value of p for each set of generated shares is unique. In another embodiment, each of the plurality of generated shares are concatenated with any or a combination of a $q^{th}$ hash of the second password, checksum and other additional information pertaining to encryption of each of the generated shares. In another embodiment, the processor is configured to reconstruct the data packets from the threshold number of decrypted shares by applying the threshold scheme.

In another embodiment, the second password can be received at the processor from a second processor operatively coupled with the at least two secure cryptoprocessors.

In another embodiment, each secure cryptoprocessor comprises a counter and a timer configured to monitor instances of attempts to access the stored shares, and wherein the counter and the timer are configured to apply countermeasures to protect the shares on detection of any or a combination of recurrent and unusual instances of attempts to access the shares.

In another embodiment, the system can includes a device for data management, the device further including: a processor coupled with a memory, said memory storing instructions executable by the processor to: receive, from an entity, data packets; generate a plurality of shares pertaining to the data packets by applying a threshold scheme to the data packets; and distribute the plurality of shares amongst at least two secure cryptoprocessors operatively coupled to the device, wherein the secure cryptoprocessor allows access to the plurality of shares stored within it upon receipt of a corresponding second password, and wherein the processor is configured to re-generate the data packets from a threshold number of shares out of the plurality of generated shares, wherein the value of the threshold number is predetermined.

In an aspect, the present disclosure provides a device for data management, the device including: a processor coupled with a memory, said memory storing instructions executable by the processor to: receive, from an entity, data packets; generate a plurality of shares pertaining to the data packets by applying a threshold scheme to the data packets; and distribute the plurality of shares amongst at least two secure cryptoprocessors operatively coupled to the device, wherein the secure cryptoprocessor allows access to the plurality of shares stored within it upon receipt of a corresponding second password, and wherein the processor is configured to re-generate the data packets from a threshold number of shares out of the plurality of generated shares, wherein the value of the threshold number is predetermined.

In another aspect, the present disclosure provides a method for data management, the method including the steps of: receiving, at a computing device, and from an entity, data packets; generating, at the computing device, a plurality of shares pertaining to the data packets by applying a threshold scheme to the data packets; and distributing the plurality of shares amongst at least two secure cryptoprocessors operatively coupled with the computing device, wherein the secure cryptoprocessor allows access to the plurality of shares stored within it upon receipt of a corresponding second password, and wherein the processor is configured to re-generate the data packets from a threshold number of shares out of the plurality of generated shares, wherein the value of the threshold number is predetermined.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

Figure 1:
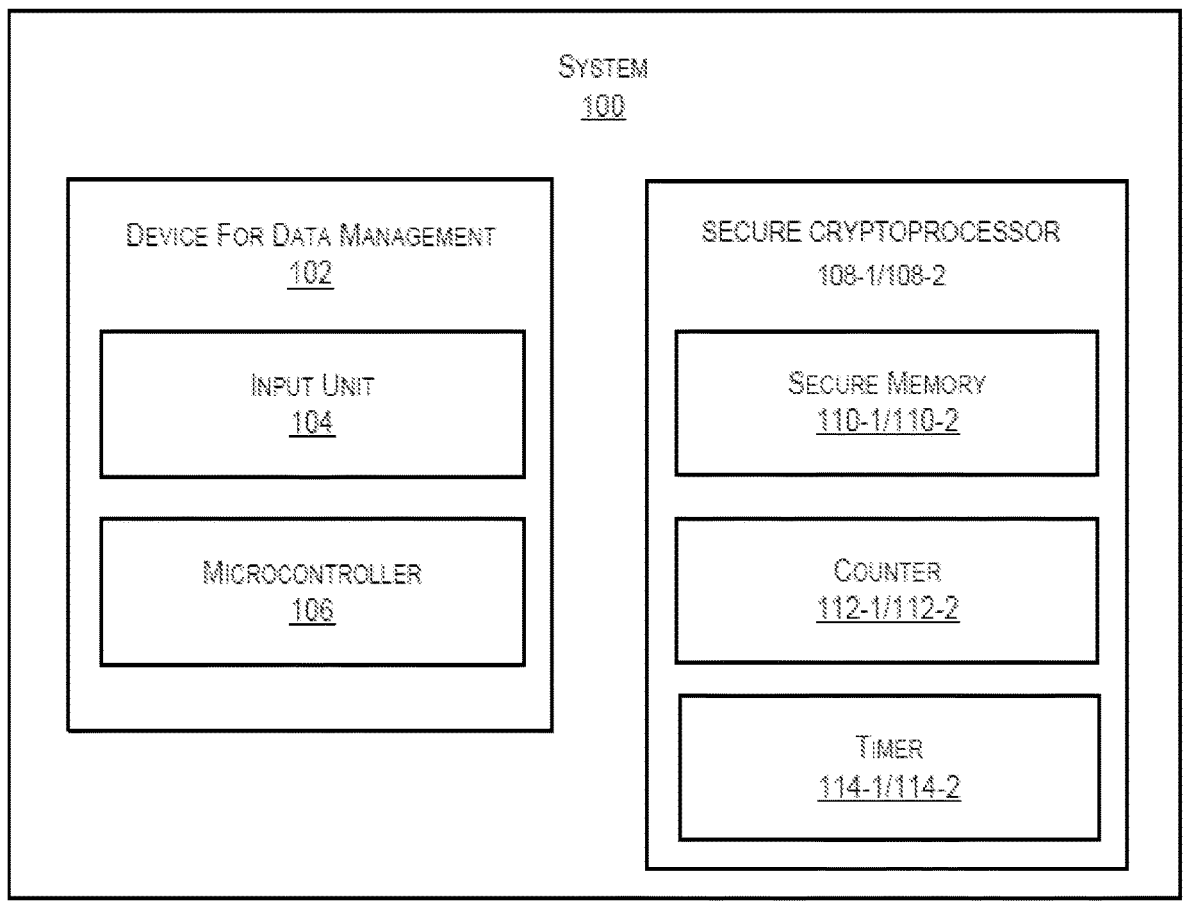
FIG. 1 illustrates an exemplary block diagram for a system for data management, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Security of private and sensitive data is paramount when internet and cloud enables storage is being constantly probed for weaknesses that can allow malicious and unscrupulous access to the private and sensitive data. Conventionally, data protection options used are, online storage on a server or on an internet connected device;
offline storage;
replication of data and storage of the replicas in different locations; and
splitting the data into discrete parts and storing the parts in different locations.

However, all of the approaches mentioned have limitations of possible data loss or data leak occurring.

Embodiments described herein relate generally to the field of data management, and in particular, to provision of security of data against external threats. The present disclosure describes an approach for recovery of data that can be performed in the presence of a group of inter-linked tamper-resistant storage devices, which store the shares of a threshold scheme. The data can be retrieved when at least the threshold number of such storage devices are available along with the password to decrypt the shares.

Threshold schemes such as Shamir's secret sharing scheme require a minimum of k unique points on a polynomial to recover the complete polynomial of degree k−1 in a 2-dimensional field. Similarly, a secret value, say Y coordinate corresponding to coordinate X=0 could also be derived from these k unique point on the polynomial. In a special implementation using Galois field, no information about any point (or the secret value) could be derived, if given number of points are less than k. Threshold schemes, thus, provide a secure way of storing information by de-constructing and then re-constructing discrete bits of data based on a presence of a unique key of k points.

Threshold schemes allow splitting of data into shares greater than or equal to a threshold value such that the original data cannot be constructed back unless there are at least the threshold number of shares.

In an aspect, the present disclosure provides a system for data management, where the system includes: a processor coupled with a memory, said memory storing instructions executable by the processor to: receive, from an entity, data packets; generate a plurality of shares pertaining to the data packets by applying a threshold scheme to the data packets; and distribute the plurality of shares amongst at least two secure cryptoprocessors, wherein the secure cryptoprocessor allows access to the plurality of shares on receipt of a second password, and wherein the processor is configured to re-generate the data packets from a threshold number of shares out of the plurality of generated shares, wherein the value of the threshold number is predetermined.

In another embodiment, the processor is configured to receive a user-input password pertaining to access to shares stored in any secure cryptoprocessor, and wherein access to the shares stored in the any secure cryptoprocessor is granted based on positive determination of similarity between $q^{th}$ hash of the user-input password and the $q^{th}$ hash of the second password.

In another embodiment, on negative determination of similarity between $q^{th}$ hash of the user-input password and the $q^{th}$ hash of the second password, counter measures are applied to protect the plurality of shares.

In another embodiment, the processor is configured to receive, from the entity, a first password.

In an embodiment, a $p^{th}$ hash of the first password is used to encrypt the data packets, where p is lesser than q.

In another embodiment, a $p^{th}$ hash of the first password is used to encrypt each of the plurality of generated shares, where p is lesser than q.

In another embodiment, the system can includes a device for data management, the device further including: a processor coupled with a memory, said memory storing instructions executable by the processor to: receive, from an entity, data packets; generate a plurality of shares pertaining to the data packets by applying a threshold scheme to the data packets; and distribute the plurality of shares amongst at least two secure cryptoprocessors operatively coupled to the device, wherein the secure cryptoprocessor allows access to the plurality of shares on receipt of a second password, and wherein the processor is configured to re-generate the data packets from a threshold number of shares out of the plurality of generated shares, wherein the value of the threshold number is predetermined.

FIG. 1 illustrates an exemplary block diagram for a system for data management, in accordance with an embodiment of the present disclosure. The system 100 includes: a device for data management 102 (hereinafter, also referred to as "device 102"); and two secure cryptoprocessors 108-1, 108-2 (hereinafter, collectively designated 108). In one embodiment, the device 102 and any one of the two secure cryptoprocessors 108 can be integrated together into a single device. It would be appreciated that the system 100 can be implemented on a plurality of devices (such as 102-1, 102-2 . . . 102-n; not shown in figure) and the plurality of devices can be operatively coupled with the secure cryptoprocessors, where the number of secure cryptoprocessors can be at least two, and can extend to more secure cryptoprocessors (such as 108-3, 108-4 . . . 108-n; not shown in figure).

In an exemplary embodiment, the secure cryptoprocessor can be any of a trusted execution environment (TEE), a trusted platform module (TPM), a hardware security module (HSM), a smart card and a secure element.

In another exemplary embodiment, the system 100 can include any one or a combination of the above-mentioned cryptoprocessors.

In another embodiment, the device 102 can include an input unit 104; and a microcontroller 106. The input unit 104 is used to receive data packets from a user. The microcontroller 106 can apply a threshold scheme to generate a plurality of shares pertaining to the data packets. The plurality of shares is distributed and stored among the two secure cryptoprocessors 108.

In another embodiment, a first password can be received from the user by the input unit 104, which the microcontroller 106 can use to encrypt the received data packets before applying a threshold scheme. The shares generated after applying the threshold scheme will then pertain to the encrypted data packets.

In an alternate embodiment, the microcontroller 106 can apply the first password after the threshold scheme has been applied to encrypt the generated shares. In this embodiment, each set of shares to be sent to a corresponding secure cryptoprocessor can have a unique first password.

The secure cryptoprocessors 108 can include respectively, secure memory 110-1, 110-2 (hereinafter, collectively designated 110); counters 112-1, 112-2 (hereinafter, collectively designated 112); and timers 114-1, 114-2 (hereinafter, collectively designated 114). The secure memory 110 stores the generated shares and the counter 112 and timer 114 serve to monitor activity of instances of attempted access to the stored shares. On detection of unusual activity, countermeasures are deployed to protect the shares.

Figure 2:
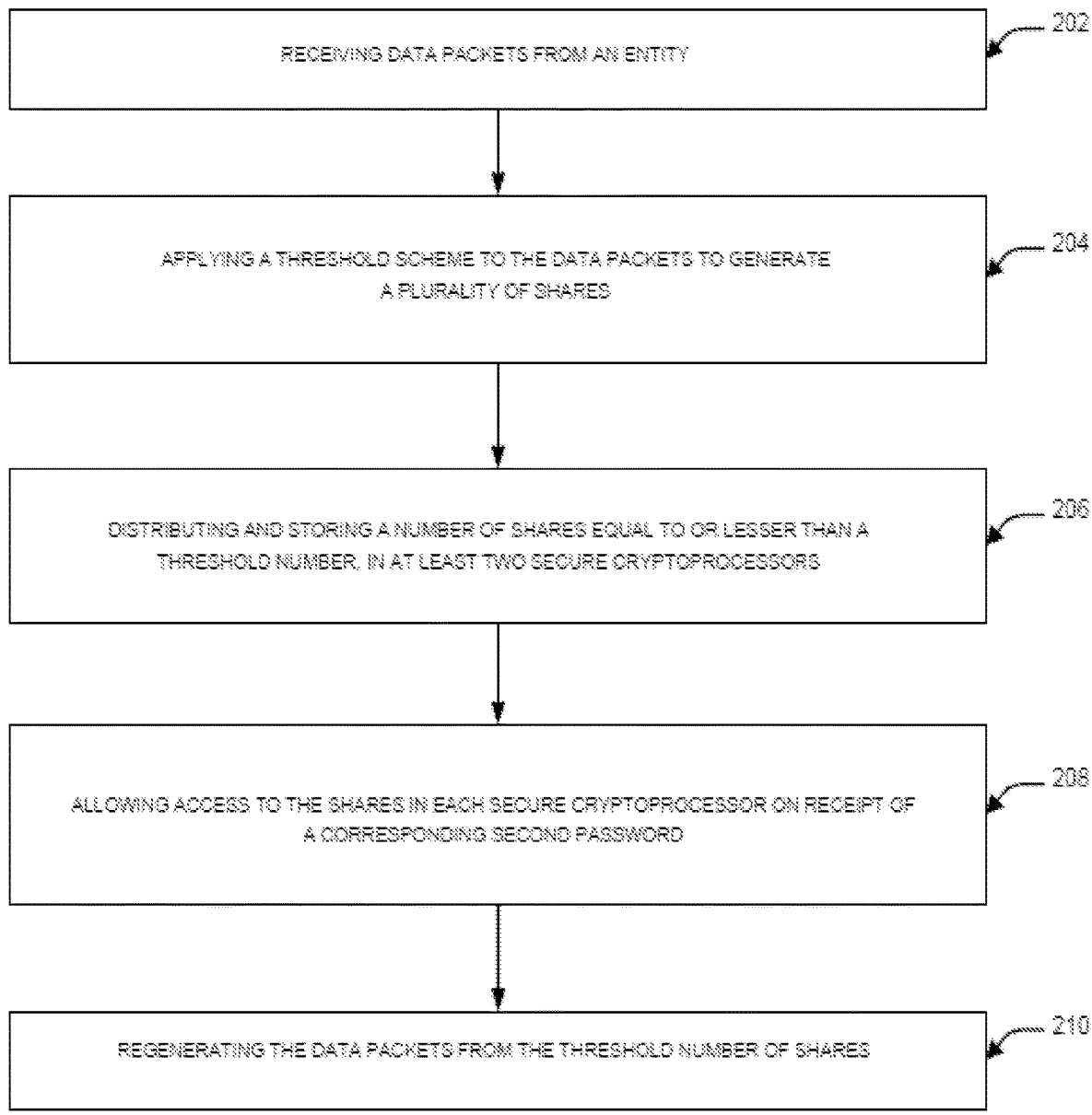
FIG. 2 illustrates an exemplary block diagram for a method for data management, in accordance with an embodiment of the present disclosure.

FIG. 2 illustrates an exemplary flow diagram for a method for data management, in accordance with an embodiment of the present disclosure. The method 200 includes the steps of:
202—receiving data packets from a user;
204—applying a threshold scheme to the data packets to generate a plurality of shares of the data packets;
206—distributing and storing a number of shares equal to or lesser than a threshold number of shares in at least two secure cryptoprocessors, where the value of the threshold number can be predetermined;
208—allowing access to the shares in each secure device on receipt of a corresponding second password; and
210—regenerating the data packets from the threshold number of shares.

In an embodiment, a first password can be applied on the data packets to encrypt the data packets before applying the threshold scheme.

In an alternate embodiment, the threshold scheme can be applied to the data packets to generate a plurality of shares, which can then be encrypted using the first password to obtain the plurality of encrypted shares. In this embodiment, each set of shares to be sent to a corresponding secure cryptoprocessor can have a unique first password.

The embodiments of the system and method for data management are elaborated hereunder, in FIG. 3, FIGS. 4A-4B and FIGS. 5A-5B.

Figure 3:
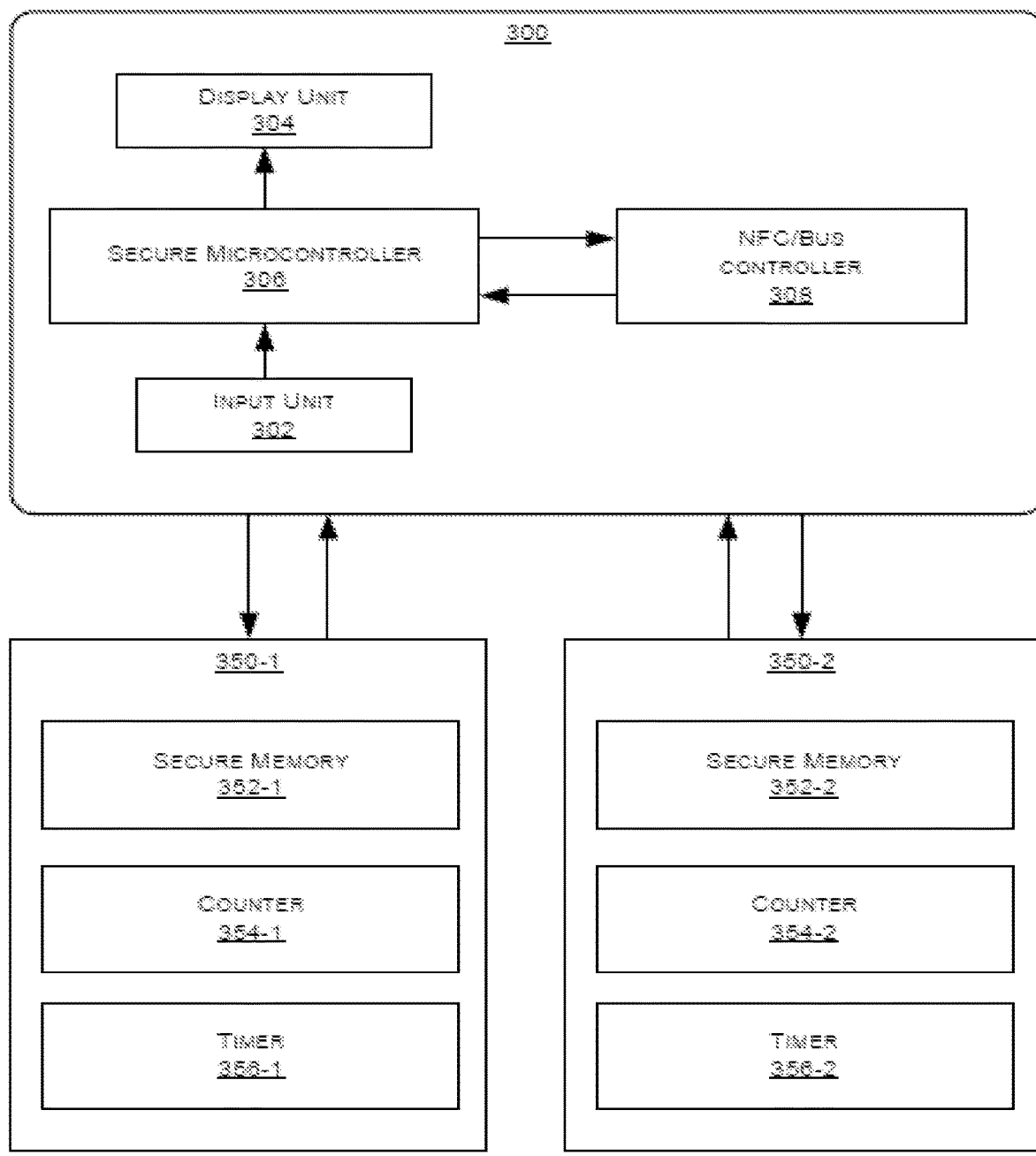
FIG. 3 illustrates an exemplary representation of a device and secure cryptoprocessors for data management, in accordance with an embodiment of the present disclosure.

FIG. 3 illustrates an exemplary representation of a device and secure cryptoprocessors for data management, in accordance with an embodiment of the present disclosure. The device 300 is adapted to receive input pertaining to data packets from a user, though an input unit 302 provided in the device 300. The device 300 can include a display unit 304 on which the user can verify parameters associated with the data packets, which pertain to authenticity of the data packets. The device 300 is adapted to apply a suitable threshold scheme to the received data packets to convert the data packets into shares. In another embodiment, the device 300 can receive a first password from the user through the input unit 302, which can be applied to protect the contents of the data packets. In an embodiment, on application of the password, the data packets are symmetrically encrypted with a $p^{th}$ hash of the first password. In another embodiment, the encryption of the data packets can be implemented by a microcontroller 306 provided in the device 300 and operatively coupled to the components of the device 300.

In an alternate embodiment, the suitable threshold scheme can be applied to the data packets to generate a plurality of shares, which can then be encrypted using the $p^{th}$ hash of the first password to obtain the plurality of encrypted shares. It would be appreciated that each set of shares to be sent to a corresponding secure cryptoprocessor can have a unique first password.

In another embodiment, the generated shares are distributed and stored in two secure cryptoprocessors 350-1, 350-2 (hereinafter, collectively designated 350) operatively coupled with the device 300 through a secure communications unit 308 present on the device 300. Access to the stored shares in a secure cryptoprocessor can be protected by a second password. It would be appreciated that each secure cryptoprocessor can have a unique second password.

In another embodiment, along with the shares, a $q^{th}$ hash (where p and q are natural numbers, and p<q) of the second password, checksum and other additional information pertaining to the second password is securely sent to the two secure cryptoprocessors.

It would be appreciated that the value of q can be unique for each secure cryptoprocessor.

The communications unit 308 can utilise wired or wireless communications protocols. Wireless protocols can be any or a combination of Wi-Fi, mobile communications and near field communications (NFC) such as infra-red and Bluetooth.

In an exemplary embodiment, any one of the two secure cryptoprocessors 350 can be integrated within the device 300.

In another embodiment, each secure cryptoprocessor can be placed at different locations, offline. The geographic separation can serve to limit access to all the secure cryptoprocessors in one attempt. The offline nature of the secure cryptoprocessor allows safety against attack by external agents such as malwares.

In a preferred embodiment, the device 300 also functions offline to limit the threat of attack by external agents such as malware and limits single point of failure or $5 wrench attack.

It would be appreciated that the device can be any device equipped with an input means, a computing means and a transmitting means such as, without limitations, mobile phone, tablet, laptop etc.

In another embodiment, for access or recovery of the encrypted shares stored in the secure cryptoprocessors 350, a user is required to enter a correct password (i.e., the second password). The user-input (i.e., the password entered by the user) can be entered at the input unit 302 through any means. On entry of the user-input, a $q^{th}$ hash of the user-input is sent to the secure cryptoprocessors 350 for authentication. When the $q^{th}$ hash of the user-input matches with the $q^{th}$ hash of the second password, the entered user-input is deemed authentic and access to the shares in the secure cryptoprocessor is granted.

In another embodiment, the encrypted shares are stored in secure memory 352-1, 352-2 (hereinafter, collectively designated 352) of the secure cryptoprocessors 350. The secure cryptoprocessors 350 further include counters 354-1, 354-2 (hereinafter, collectively designated 354) and timers 356-1, 356-2 (hereinafter, collectively designated 356), which function to monitor and record attempts or instances of access to the data packets stored in the secure memory 352 of the secure cryptoprocessors 350. The monitoring can also serve to prevent access to the data packets when an attempt at access is construed as recurrent attempts or unusual attempts, such as recurrent application of a false or wrong password. This secure memory 352 further prevents access to the data packets through brute force attack.

Brute force attacks on the secure cryptoprocessors 350 can be limited by any or a combination of,
  deleting the stored information in the secure cryptoprocessors 350;
  encrypting and locking the contents of the secure cryptoprocessors 350 using the counter 354 and a secret key installed in the secure cryptoprocessors 350, where the secret key is adapted to be unlocked only after verification with an external entity such as a manufacturer of the secure cryptoprocessors; and
  implementing an exponential timer function with the help of the counter 354 and timer 356, where, for every entry of incorrect password, the time duration to allow a subsequent entry of a password increases exponentially.

In an exemplary implementation of the proposed system, the data packets can be a private key which would be required for facilitating a particular transaction. The system can be configured such that the private key is generated when the threshold number of shares are fetched, and the private key is re-generated using the threshold number of shares. The system can be provided with a volatile memory that can store the private key temporarily, and after the transaction is complete, the private key can be permanently erased from the volatile memory.

Figure 4A:
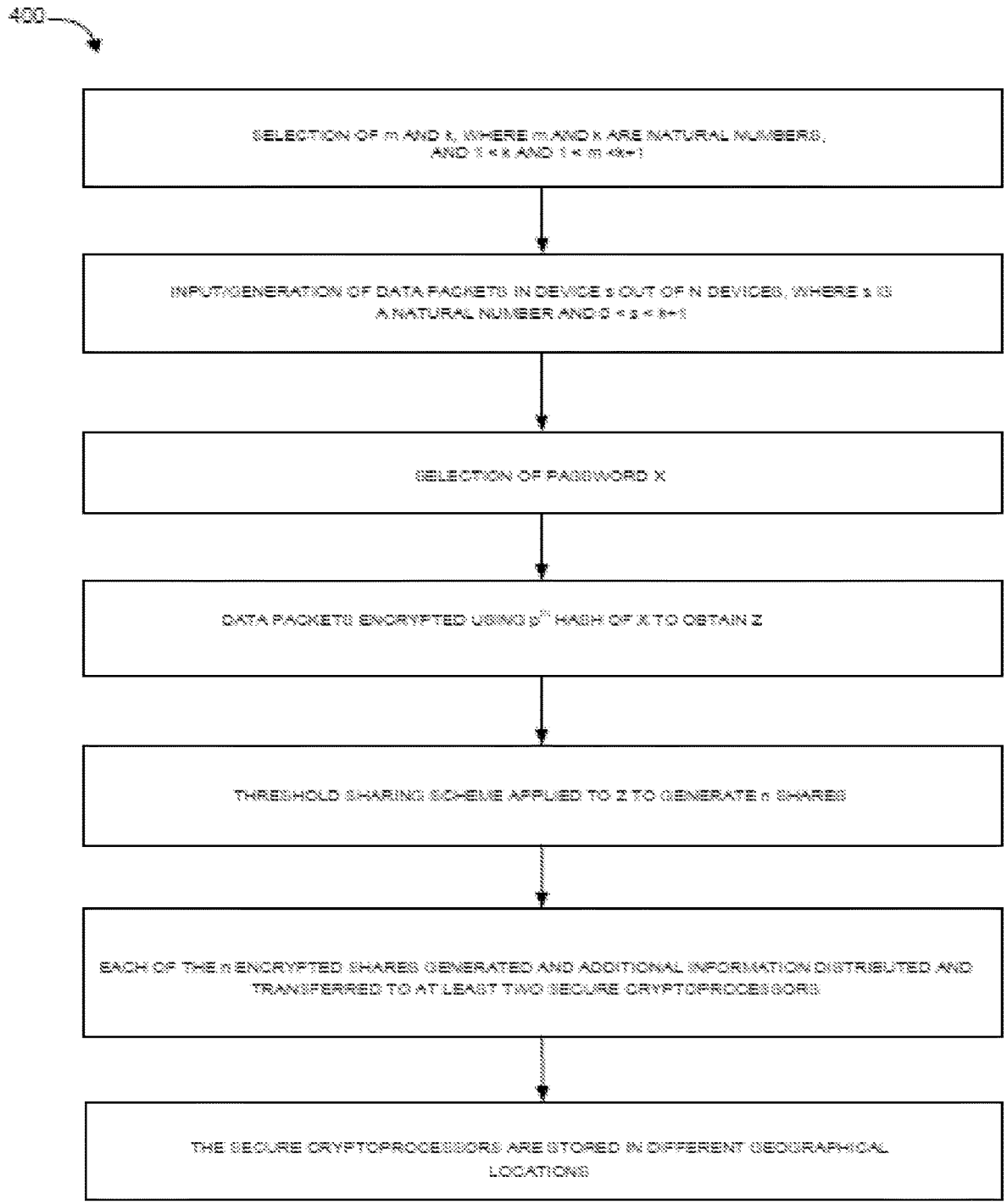
FIG. 4A illustrates an exemplary flow diagram of a method 400 to secure data packets, as implementable in the proposed device, in accordance with an embodiment of the present disclosure.

FIG. 4A illustrates an exemplary flow diagram of a method 400 to secure data packets, as implementable in the proposed device, in accordance with an embodiment of the present disclosure. Consider,
  m: threshold number of shares required for reconstruction of the data packets;
  n: total number of shares generated;
  k: number of secure cryptoprocessors;
  j: number of secure cryptoprocessors, which, together, contain m shares;
  N: number of devices, where
    N could be equal to k if secure cryptoprocessor are integrated within the devices; and
    N could be equal to (k+1) when the device does not incorporate a secure cryptoprocessor;
  s: selected device(s);
  x: a first password for encrypting data packets or generated shares;
  y: a second password required for access to shares stored in a secure cryptoprocessor; and
  z: encrypted data packets.

In an embodiment, once s device(s) are selected out of N devices, data packets are input into each of the s device(s). In applications such as blockchain private keys, where a random number generator provided in the microcontroller generates a private key according to a cryptographic application, the input data packets can be generated private keys.

In another embodiment, a first password x is entered by a user on the device(s) s. The data packets are then symmetrically encrypted using $p^{th}$ hash of x to obtain z. The password x can be a password with a salt or a password with an asymmetric key.

In another embodiment, suitable threshold schemes are applied to z to generate n shares. Each of the n shares is concatenated with a $q^{th}$ hash of y (where p and q are natural numbers, and p<q), checksum and other additional information, and are transferred to the k secure cryptoprocessors. The k secure cryptoprocessors are protected against unauthorised access (such as brute force attack) by the second password y.

In another embodiment, each secure cryptoprocessor is stored at different remote geographic locations.

Figure 4B:
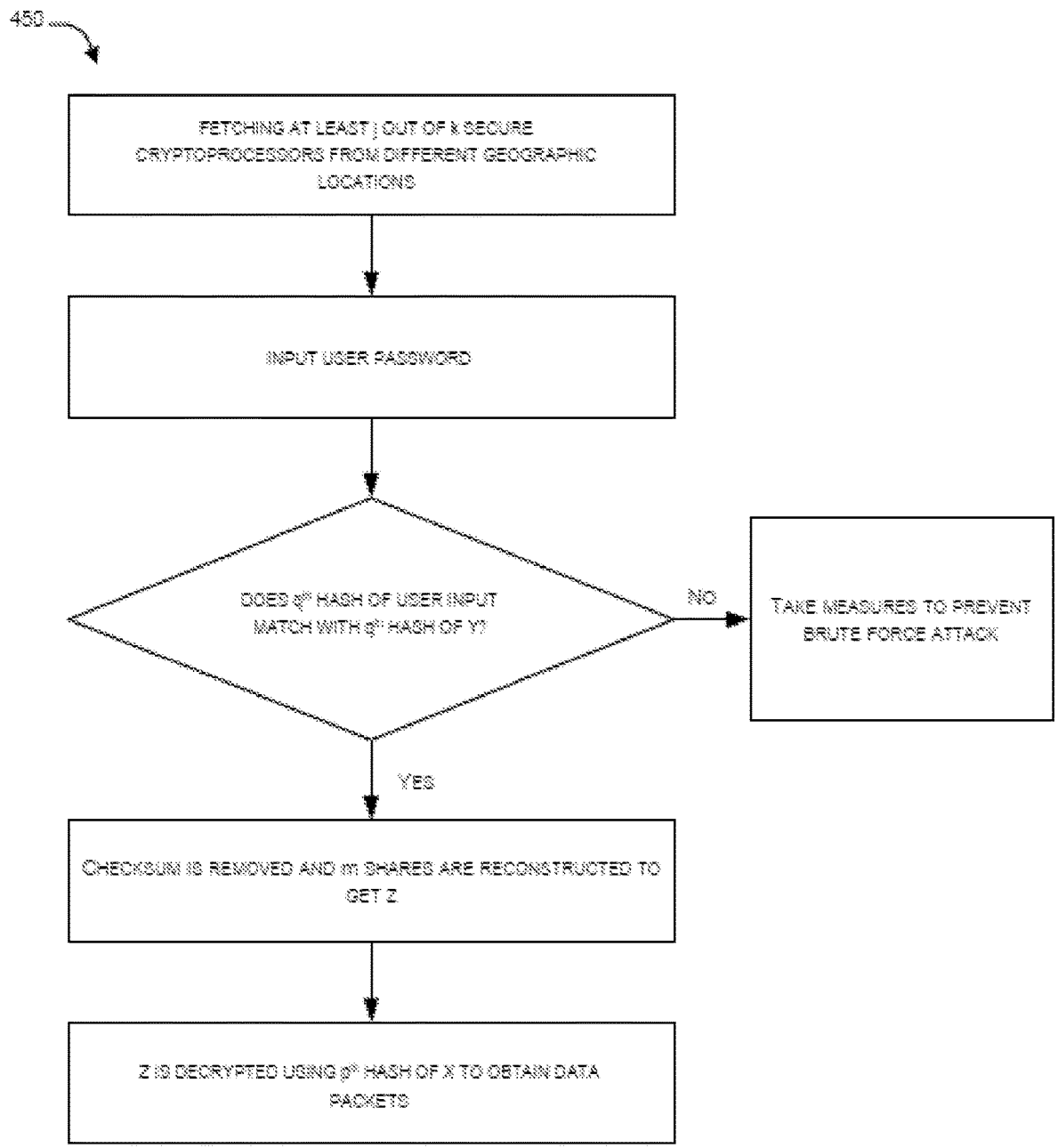
FIG. 4B illustrates an exemplary flow diagram of a method 450 to retrieve data packets, as implementable in the proposed device, in accordance with an embodiment of the present disclosure.

FIG. 4B illustrates an exemplary flow diagram of a method 450 to retrieve data packets, as implementable in the proposed device, in accordance with an embodiment of the present disclosure. To recover or retrieve the data packets, only j out of k (where, j<k) secure cryptoprocessors is required, and thus, any j secure cryptoprocessor(s) out of the k secure cryptoprocessor(s) are retrieved from the remote geographic locations. The second password y is entered into the j secure cryptoprocessors to unlock the encrypted shares inside them. The encrypted shares along with the checksum and other additional information are brought back into the device(s) sand reconstructed into z by removing the checksum and other additional information from the shares.

In an exemplary embodiment, the password y can be entered directly into the secure cryptoprocessor or through a device operatively coupled with the secure cryptoprocessor. After a password is entered, the $q^{th}$ hash of the entered password is compared with the $q^{th}$ hash of y. In case of positive match, access is granted. In case of a mismatch, suitable counter measures are applied to protect the shares.

In another embodiment, z is decrypted by using $p^{th}$ hash of x to obtain the data packets.

It would be appreciated that a first password x to encrypt the data packet and a second password y to unlock the encrypted shares can be the same or can be different and that each secure cryptoprocessor can have a unique second password y. It would further be appreciated that each secure cryptoprocessor can have a unique value of q.

Figure 5A:
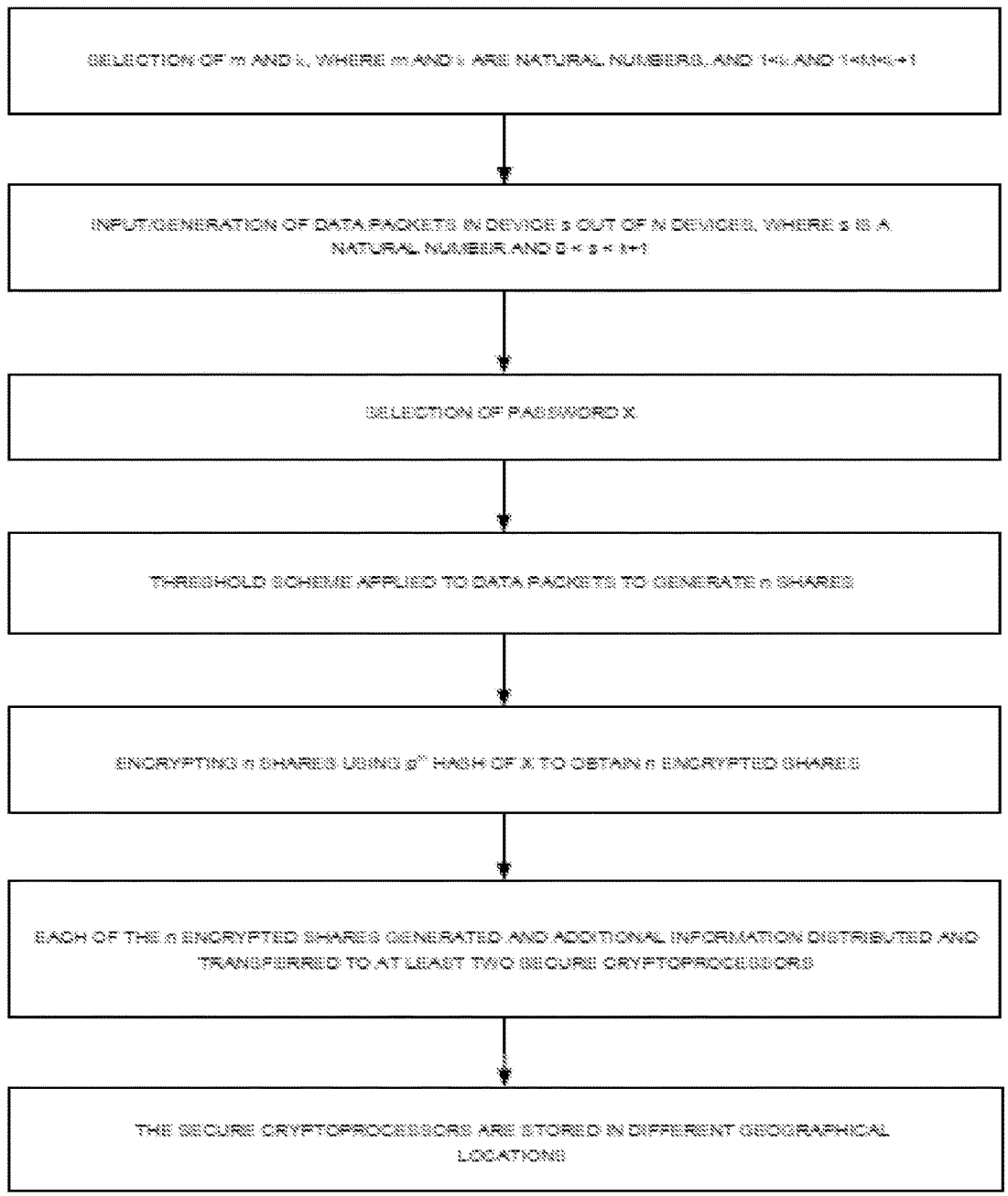
FIG. 5A illustrates an exemplary flow diagram of a method 500 to secure data packets, as implementable in the proposed device, in accordance with an alternate embodiment of the present disclosure.

FIG. 5A illustrates an exemplary flow diagram of a method 500 to secure data packets, as implementable in the proposed device, in accordance with an alternate embodiment of the present disclosure.

In an embodiment, once s device(s) are selected out of N devices, data packets are input into each of the s device(s). In applications such as block chain private keys, where a random number generator provided in the microcontroller generates a private key according to a cryptographic application, the input data packets can be the generated private keys.

In another embodiment, suitable threshold schemes are applied to the data packets to generate n shares.

In another embodiment, a password x is entered by a user on the device(s) s. Each of the n shares are then symmetrically encrypted using $p^{th}$ hash of x to obtain n encrypted shares. The password x can be a password with a salt or a password with an asymmetric key.

Each of the n shares is concatenated with a $q^{th}$ hash of the second password y (where p and q are natural numbers, and p<q), checksum and other additional information, and are transferred to the k secure cryptoprocessors. The k secure cryptoprocessors are protected against unauthorised access (such as brute force attack) by the second password y.

In another embodiment, each secure cryptoprocessor is stored at different remote geographic locations.

Figure 5B:
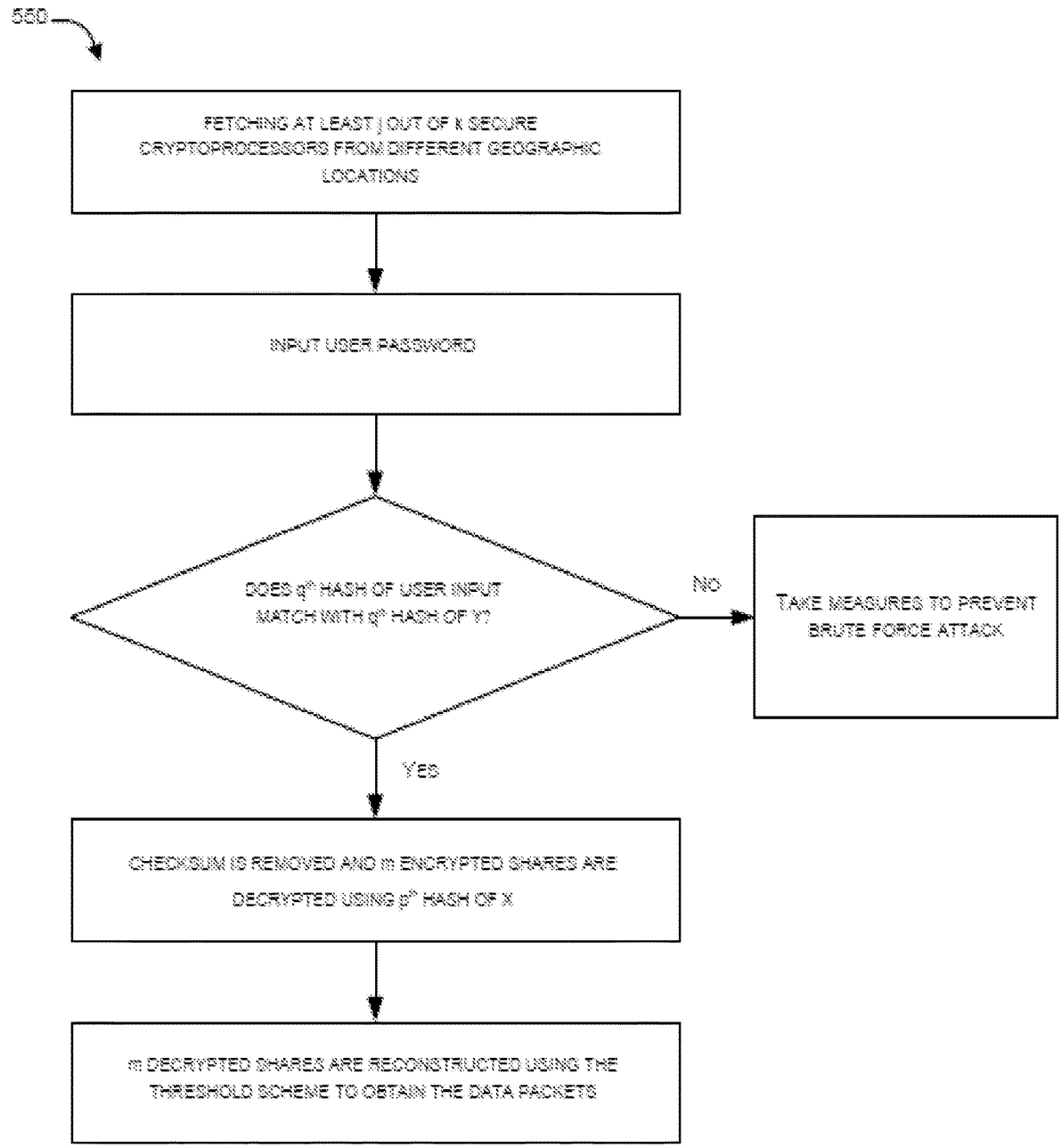
FIG. 5B illustrates an exemplary flow diagram of a method 550 to retrieve data packets, as implementable in the proposed device, in accordance with an alternate embodiment of the present disclosure.

FIG. 5B illustrates an exemplary flow diagram of a method 550 to retrieve data packets, as implementable in the proposed device, in accordance with an alternate embodiment of the present disclosure. To recover or retrieve the data packets, only j out of k secure cryptoprocessors is required, and thus, any j secure cryptoprocessor(s) out of the k secure cryptoprocessor(s) are retrieved from the remote geographic locations. The second password y is entered into the j secure cryptoprocessors to unlock the encrypted shares inside them. The encrypted shares along with the checksum and other additional information are brought back into the device(s) x and decrypted using $p^{th}$ hash of y. The decrypted shares are reconstructed back using the suitable threshold scheme to obtain the data packets.

In an exemplary embodiment, the password y can be entered directly into the secure cryptoprocessor or through a device operatively coupled with the secure cryptoprocessor. After a password is entered, the $q^{th}$ hash of the entered password is compared with the $q^{th}$ hash of y. In case of positive match, access is granted. In case of a mismatch, suitable counter measures are applied to protect the shares.

It would be appreciated that a first password x to encrypt the data packet and a second password y to unlock the encrypted shares can be the same or can be different, each set of shares to be sent to a corresponding secure cryptoprocessor can have a unique first password x and each secure cryptoprocessor can have a unique second password y. It would further be appreciated that the value of p for encryption of each set of shares can be unique and that the value of q can be unique for each secure cryptoprocessor.

In another embodiment, communication between device(s) and their corresponding secure cryptoprocessor(s) can occur through any secure wired or wireless communications technologies. Preferably, wireless means such as Wi-Fi, mobile communications and near field communications (NFC) such as infra-red and Bluetooth and a combination thereof are used.

Figure 6:
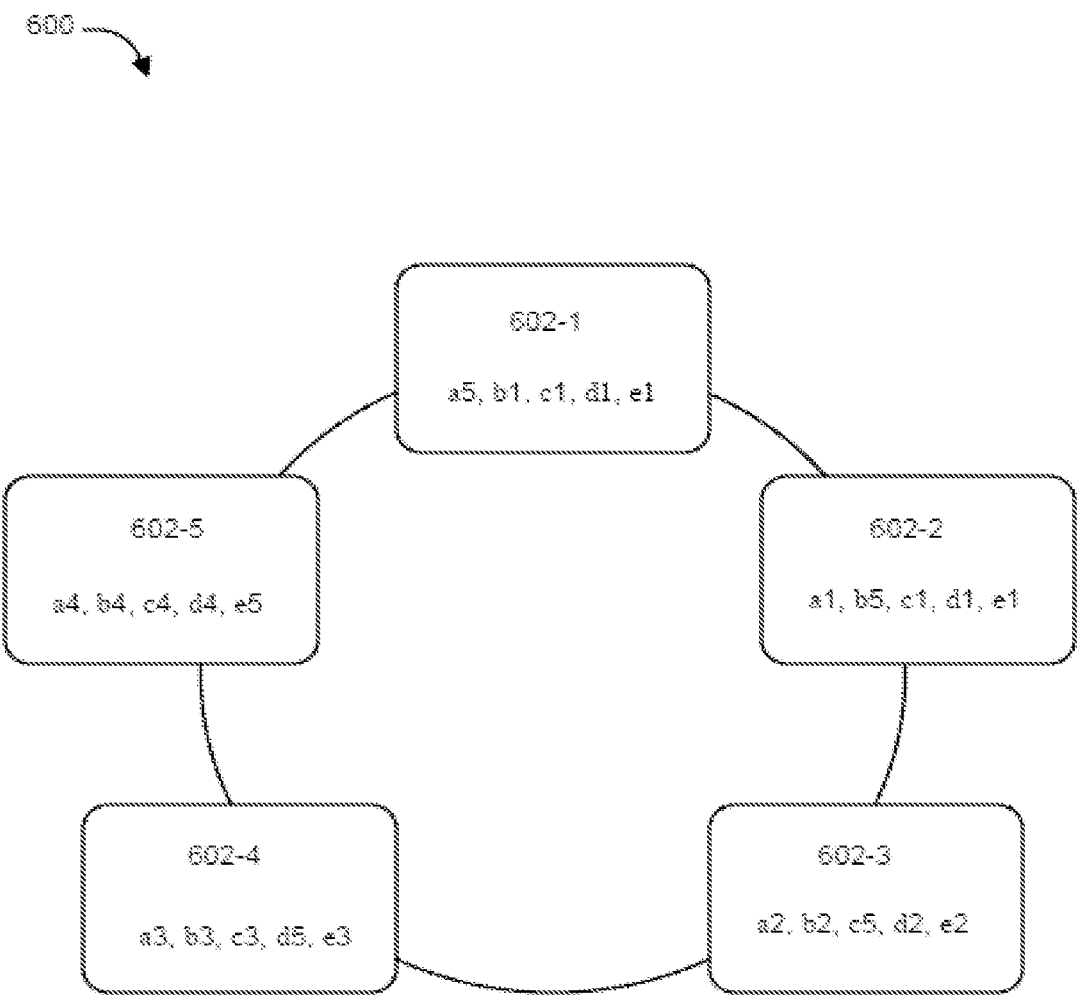
FIG. 6 illustrates an exemplary representation of storage and distribution of encrypted shares of the data packets in a plurality of secure cryptoprocessors, in a common network, for data management, in accordance with an embodiment of the present disclosure.

FIG. 6 illustrates an exemplary representation of storage and distribution of encrypted shares of the data packets in a plurality of secure cryptoprocessors, in a common network, for data management, in accordance with an embodiment of the present disclosure. The network 600 can include a plurality of devices 602-1, 602-2 . . . 602-n (hereinafter, collectively designated 602).

In another embodiment, each device 602 can also be provided with a secure cryptoprocessor integrated within the device.

In another embodiment, a number of devices, each having received data packets can be distributed at different geographic locations. The data packets in each device can be put through the threshold scheme to generate shares, and where a number of shares lesser than the threshold value can be stored in each of the devices apart from the one in which the data packets of the generated shares is input.

In another embodiment, a number of shares lesser than the threshold value can also be stored in each of the devices.

Table 1 below illustrates an exemplary sharing scheme of data packets of a plurality of devices. of shares by a plurality of devices (602-1, 602-2 . . . 602-5) in the network 600.

TABLE 1 exemplary sharing scheme of data packets of a plurality of devices

| Device | Generated Shares | Password Encrypted Shares |
|---|---|---|
| 602-1 | A1, A2, A3, A4, A5 | a1, a2, a3, a4, a5 |
| 602-2 | B1, B2, B3, B4, B5 | b1, b2, b3, b4, b5 |
| 602-3 | C1, C2, C3, C4, C5 | c1, c2, c3, c4, c5 |
| 602-4 | D1, D2, D3, D4, D5 | d1, d2, d3, d4, d5 |
| 602-5 | E1, E2, E3, E4, E5 | e1, e2, e3, e4, e5 |

Referring to FIG. 6, in one embodiment, encrypted shares for a data packet of any one device (such as device 602-1) can be stored on any of the other devices (602-2, 602-3 . . . 602-5).

In another embodiment, each device (602-1, 602-2 . . . 602-5) can store an encrypted share of a data packet entered in it (respectively, a5, b5, c5, d5, e5).

In this instance, the user can still recover their data packets even in the event of loss or damage to any of the devices, as a threshold number of shares can be retrieved from any or all of the remaining devices. However, reconstruction of the shares can occur only in the event of the correct password being entered, thereby allowing the user to protect their shares on other devices as well.

Thus, the present disclosure provides a system, device and a method implementable on the device for secure management of data stored on the device. The device can be provided with a secure cryptoprocessor or can be operatively coupled to one, on which the data packets to be secured is stored, along with information pertaining to encryption of the data packets. The hardware in the device enables protection from online attacks such as malware attacks and the tamper resistant property of the device can prevent brute force attacks.

Figure 7:
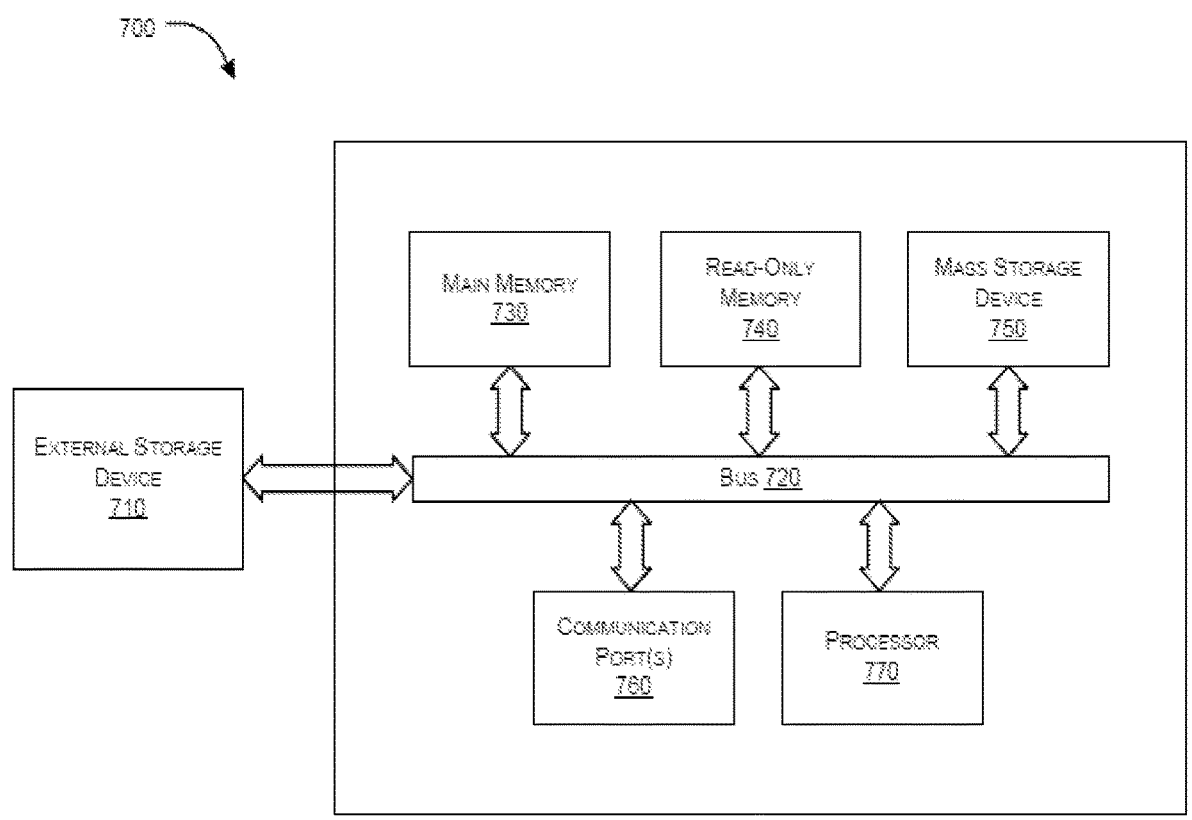
FIG. 7 illustrates a computer system in which or with which embodiments of the present invention can be utilized in accordance with embodiments of the present disclosure.

FIG. 7 illustrates a computer system in which or with which embodiments of the present invention can be utilized in accordance with embodiments of the present disclosure.

As shown in FIG. 7, computer system includes an external storage device 710, a bus 720, a main memory 730, a read only memory 740, a mass storage device 750, communication port 760, and a processor 770. A person skilled in the art will appreciate that computer system may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention. Communication port 760 can be any of an RS-232 port for use with a modem-based dialup connection, a 10/100 Ethernet port, a Gigabit or 10 Gigabit port using copper or fibre, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be apparent to those skilled in the art that many more modifications besides those already described are possible without departing from the inventive concepts herein. The inventive patient matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT INVENTION

The present invention provides a system, method and device for data management of data packets for security of data packets.

The present invention provides a system capable of protecting data packets against data loss or data leak.

The present invention provides a system capable of protecting data packets from brute force attacks.

The present invention provides a system capable of protecting data packets from malware attacks and limits single point of failure or $5 wrench attack.

The present invention provides a system for data management of data packets using tamper-resistant dedicated hardware devices and cryptographic encryption that prevents the data packets from being retrieved even when the threshold number of shares or more are acquired by an external entity.

We claim:

1. A system for data management, said system comprising:
   a processor coupled with a memory, said memory storing instructions executable by the processor to:
   receive, from an entity, data packets;
   generate a plurality of shares pertaining to the data packets by applying a threshold scheme to the data packets; and
   distribute the plurality of shares amongst at least two secure cryptoprocessors,
   wherein each secure cryptoprocessor allows access to the plurality of shares stored within it upon receipt of a corresponding second password, and
   wherein the processor is configured to re-generate the data packets from a threshold number of shares out of the plurality of generated shares, a value of the threshold number being predetermined.

2. The system as claimed in claim 1, wherein each secure cryptoprocessor stores a number of shares that is equal to the threshold number of shares.

3. The system as claimed in claim 1, wherein each secure cryptoprocessor stores a number of shares that is lesser than the threshold number of shares.

4. The system as claimed in claim 1, wherein the processor is configured to receive a user-input password pertaining to access to shares stored in any secure cryptoprocessor, and wherein access to the shares stored in the any secure cryptoprocessor is granted based on positive determination of similarity between $q^{th}$ hash of the user-input password and the $q^{th}$ hash of the second password.

5. The system as claimed in claim 4, wherein, on negative determination of similarity between $q^{th}$ hash of the user-input password and the $q^{th}$ hash of the second password, counter measures are applied to protect the plurality of shares.

6. The system as claimed in claim 4, wherein each secure cryptoprocessor uses a unique value of q.

7. The system as claimed in claim 1, wherein the processor is configured to receive, from the entity, a first password.

8. The system as claimed in claim 7, wherein a $p^{th}$ hash of the first password is used to encrypt the data packets, where p is lesser than q.

9. The system as claimed in claim 8, wherein each of the plurality of generated shares are concatenated with any or a combination of a $q^{th}$ hash of the second password, checksum and other additional information pertaining to encryption of the data packets.

10. The system as claimed in claim 8, wherein the processor is configured to decrypt the encrypted data packets obtained after reconstruction of the threshold number of shares into the data packets by applying the $p^{th}$ hash of the first password.

11. The system as claimed in claim 7, wherein a $p^{th}$ hash of the first password is used to encrypt each of the plurality of generated shares, where p is lesser than q.

12. The system as claimed in claim 11, wherein each set of generated shares to be distributed to a secure cryptoprocessor is encrypted using $p^{th}$ hash of a first password of the corresponding secure cryptoprocessor.

13. The system as claimed in claim 11, wherein the value of p for each set of generated shares is unique.

14. The system as claimed in claim 11, wherein each of the plurality of generated shares are concatenated with any or a combination of a $q^{th}$ hash of the second password, checksum and other additional information pertaining to encryption of each of the generated shares.

15. The system as claimed in claim 11, wherein the processor is configured to reconstruct the data packets from the threshold number of decrypted shares by applying the threshold scheme.

16. The system as claimed in claim 1, wherein the second password is received at the processor from a second processor operatively coupled with the at least two secure cryptoprocessors.

17. The system as claimed in claim 1, wherein each secure cryptoprocessor comprises a counter and a timer configured to monitor instances of attempts to access the stored shares, and wherein the counter and the timer are configured to apply countermeasures to protect the shares on detection of any or a combination of recurrent and unusual instances of attempts to access the shares.

18. The system as claimed in claim 1, wherein the system comprises a device for data management, said device comprising:
   a processor coupled with a memory, said memory storing instructions executable by the processor to:
   receive, from an entity, data packets;
   generate a plurality of shares pertaining to the data packets by applying a threshold scheme to the data packets; and
   distribute the plurality of shares amongst at least two secure cryptoprocessors operatively coupled to the device,
   wherein each secure cryptoprocessor allows access to the plurality of shares stored within it upon receipt of a corresponding second password, and
   wherein the processor is configured to re-generate the data packets from a threshold number of shares out of the plurality of generated shares, the value of the threshold number being predetermined.

19. A device for data management, said device comprising:
   a processor coupled with a memory, said memory storing instructions executable by the processor to:
   receive, from an entity, data packets;
   generate a plurality of shares pertaining to the data packets by applying a threshold scheme to the data packets; and
   distribute the plurality of shares amongst at least two secure cryptoprocessors operatively coupled to the device,
   wherein each secure cryptoprocessor allows access to the plurality of shares stored within it upon receipt of a corresponding second password, and
   wherein the processor is configured to re-generate the data packets from a threshold number of shares out of the plurality of generated shares, a value of the threshold number being predetermined.

20. A method for data management, said method comprising the steps of:
   receiving, at a computing device, and from an entity, data packets;
   generating, at the computing device, a plurality of shares pertaining to the data packets by applying a threshold scheme to the data packets; and
   distributing the plurality of shares amongst at least two secure cryptoprocessors operatively coupled with the computing device,
   wherein each secure cryptoprocessor allows access to the plurality of shares stored within it upon receipt of a corresponding second password, and wherein the processor is configured to re-generate the data packets from a threshold number of shares out of the plurality of generated shares, a value of the threshold number being predetermined.

* * * * *